United States Patent [19]

Harada et al.

[11] Patent Number: 4,713,988
[45] Date of Patent: Dec. 22, 1987

[54] TRANSMISSION CONTROL DEVICE

[75] Inventors: Yoshiharu Harada, Toyota; Yutaka Taga, Aichi; Kagenori Fukumura, Toyota; Yoichi Hayakawa, Toyoake; Masao Kawai, Chiryu, all of Japan

[73] Assignees: Toyota Jidosha Kabushiki Kaisha; Aisin-Warner Kabushiki Kaisha, both of Aichi, Japan

[21] Appl. No.: 820,156

[22] Filed: Jan. 21, 1986

[30] Foreign Application Priority Data

Jan. 19, 1985 [JP] Japan .................................... 60-7763
Jan. 19, 1985 [JP] Japan .................................... 60-7764

[51] Int. Cl.$^4$ ............................................. B60K 41/06
[52] U.S. Cl. ..................................... 74/868; 74/752 C
[58] Field of Search ............. 74/868, 869, 867, 752 C, 74/752 A, 752 D, 866; 180/247

[56] References Cited

U.S. PATENT DOCUMENTS

4,369,671 1/1983 Matsumoto et al. ........... 180/247 X
4,444,073 4/1984 Moroto et al. ................... 74/869 X
4,484,654 11/1984 Hayakawa ......................... 180/247
4,503,927 3/1985 Hayakawa et al. ................ 180/247

Primary Examiner—Rodney H. Bonck
Assistant Examiner—Dwight G. Diehl
Attorney, Agent, or Firm—Wegner & Bretschneider

[57] ABSTRACT

The transmission control device of the present invention comprises a main transmission and a sub transmission and has a first hydraulic switching device which is controlled by automatic operation for setting the shift range of the sub transmission and a second hydraulic switching device which controls the hydraulic pressure produced by the first hydraulic switching device, prohibits any speed change of the shift range, and controls other functions of the sub transmission. By the above-described structure, the transmission control device of the present invention is able to prohibit speed changes in the shift range and to control other functions of the sub transmission regardless of the automatic operation of the sub transmission, because the second hydraulic switching device can control the hydraulic pressure produced by the first hydraulic switching device even if the shift mechanism of the sub transmission is being operated by the first hydraulic switching device.

6 Claims, 6 Drawing Figures

TRANSMISSION CONTROL DEVICE

BACKGROUND OF THE INVENTION

The present invention relates to a transmission control device comprising a main transmission and a sub transmission.

A transmission having a main transmission such as an automatic transmission and a manual transmission, a speed-change mechanism and a sub transmission which selectively attain the gear ranges of the speed-change mechanism has conventionally been known. In this case, for example, a planetary gear device is used for the speed-change mechanism of the sub transmission, the input shaft of the sub transmission is connected to a sun gear of the planetary gear device, the output shaft of the sub transmission is connected to the carrier of the planetary gear device, and a clutch for engaging and releasing the sun gear and the carrier and a brake for engaging and releasing a ring gear are provided, the clutch being engaged and the brake being released to effect a direct-coupling range and the clutch being released and the brake being engaged to effect a reduced-speed range. The engaging and releasing of the clutch and the brake are changed over by switching the working oil of the hydraulic servomotor of the frictional engagement devices of the clutch and the brake by means of the manual shift valve which is controlled by automatic operation and a low-high switching valve which is controlled by hydraulic pressure corresponding to the vehicle speed and which sets the gear ranges of the sub transmission. The low-high switching spool of the low-high switching valve which switches the working oil between the hydraulic servomotors of the frictional engagement devices of the clutch and the brake is provided for receiving hydraulic pressure (a governor pressure) corresponding to the vehicle speed at one end, and thus, when the direct-coupling range is shifted to the reduced-speed range in the case of a high vehicle speed, setting of the reduced-speed range and overreving of the engine are prohibited by the fact that the low-high switching spool receives the hydraulic pressure corresponding to the vehicle speed at one end, whereby unsuitable speed reductions are prevented. An inhibitor valve (a plunger) which sets the low-high switching spool to the direct-coupling range regardless of the hydraulic pressure corresponding to the vehicle speed when the manual shift valve is shifted from the reduced-speed range to the direct-coupling range is provided at one end of the low-high switching spool of the low-high switching valve.

In the prior art, for example, when the manual shift valve is changed from the reduced-speed range to the direct-coupling range as described above, the low-high switch spool is set at the direct-coupling range regardless of the hydraulic pressure corresponding to the running state of the vehicle such as vehicle speed, and thus it had the disadvantage that, when a driver makes a mistake in shift operation and shifts from the reduced-speed range to the direct-coupling range to set the direct-coupling range, for example, during reduced-speed running such as in climbing an incline in which the reduced-speed range is set and a large torque occurs in the driving wheels, the direct-coupling range is set regardless of the running state of the vehicle. Since the hydraulic pressure applied to the conventional low-high switching spool is the governor pressure corresponding to the vehicle speed, it is impossible to freely switch the setting of the transmission and the set speed is disadvantageously switched by the change in the governor pressure.

SUMMARY OF THE INVENTION

The object of the present invention is to provide a transmission control device capable of controlling the setting of the gear range of the sub transmission regardless of manual operations.

Another object of the present invention is to provide a transmission control device capable of preventing the setting of the gear range of the sub transmission regardless of manual operations.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

To achieve the above-described objects, the transmission control device of the invention comprises a main transmission and a sub transmission and has a first hydraulic switching means which is controlled by manual operation for setting the gear range of the sub transmission and a second hydraulic switching means which controls the hydraulic pressure produced by the first hydraulic switching means, inhibits the shift of the gear range of the sub transmission, and regulates others.

By the above-described structure, the transmission control device of the present invention can inhibit the shift of the sub transmission and regulate others regardless of the manual operation of the sub transmission because the second hydraulic switching means regulates the hydraulic pressure produced by the first hydraulic switching means, if the first hydraulic switching means operated.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

The transmission control device of the invention will be fully understood from the following description of a preferred embodiment when the same is read in conjunction with the accompanying drawings.

Figure 1:
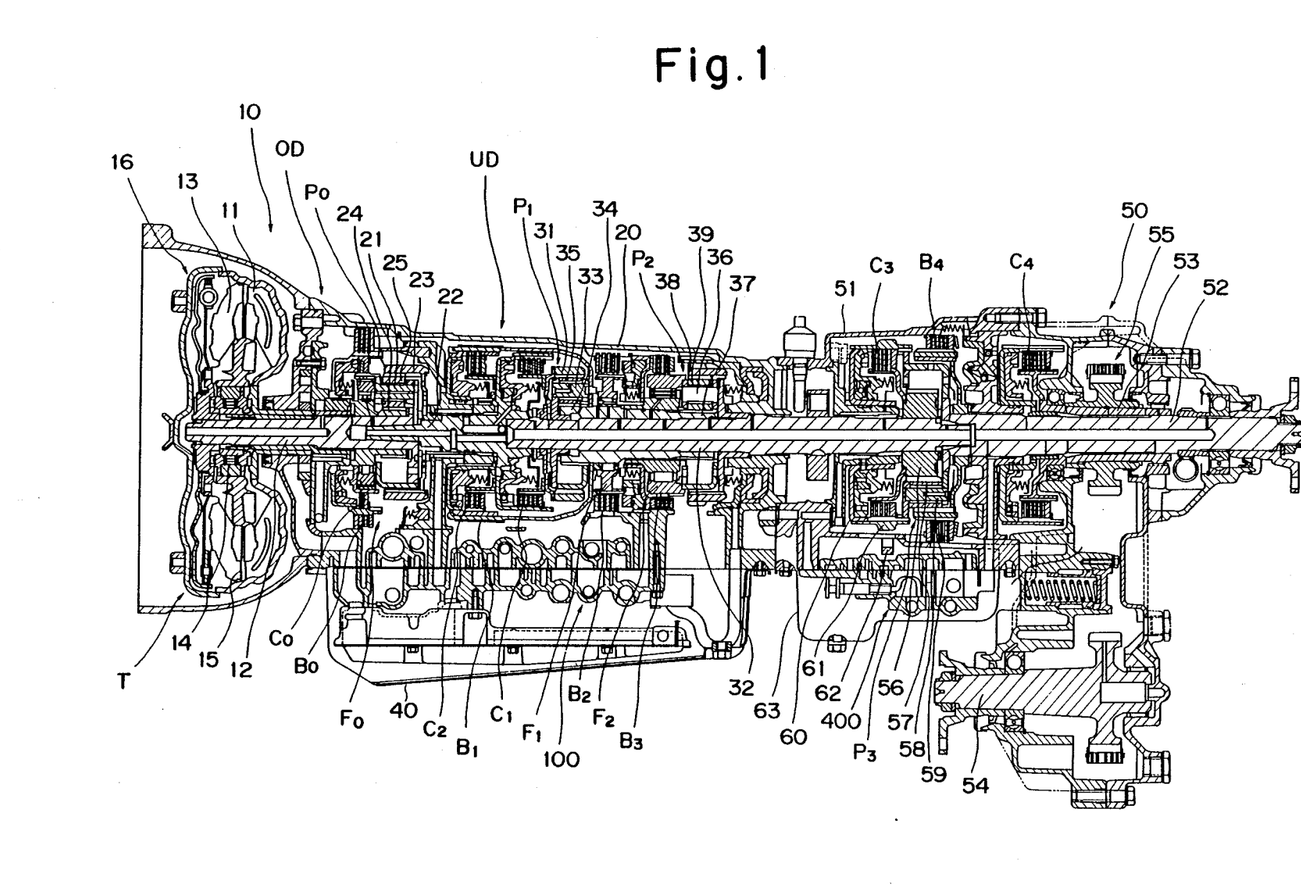
FIG. 1 is a sectional view of a four-wheel drive transmission.
Figure 2:
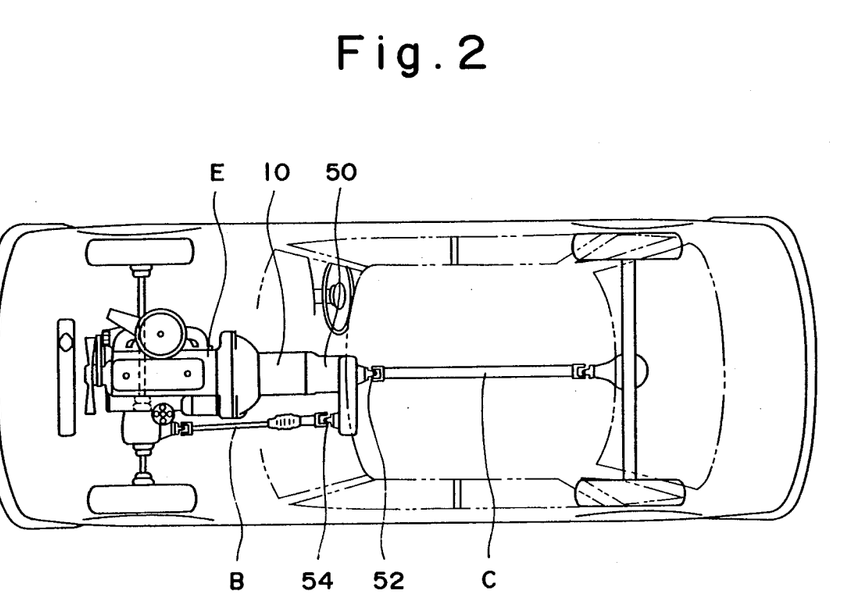
FIG. 2 schematically shows the drive mechanism of a four-wheel vehicle.

FIG. 1 is a sectional view of a transmission system to which the present invention is applied, the transmission system being composed mainly of a four-speed automatic transmission having four forward speed gears and one reverse gear, and a four-wheel drive sub transmission. FIG. 2 schematically shows a four-wheel drive vehicle in which is mounted the transmission system shown in FIG. 1.

Referring first to FIG. 1, the transmission system includes a main transmission 10 which is a four-speed automatic transmission with an overdrive, and a four-wheel drive sub transmission 50 which is coupled to the output side of a planetary gear system incorporated in the main transmission 10. The main transmission 10 is directly mounted on an engine E and has an output shaft 32 which constitutes an input shaft of the four-wheel drive sub transmission 50. The sub transmission 50 has two output shafts: namely, a first output shaft 52 coupled to a rear-wheel drive propeller shaft C and a second output shaft 54 coupled to a front-wheel drive propeller shaft B.

The main transmission 10 is constituted by a fluid type torque converter T, an overdrive mechanism OD and an underdrive mechanism UD having three forward speed gears and one reverse gear.

The torque converter T has a pump impeller 11 coupled to the output shaft of the engine E, a turbine impeller 13 coupled to the output shaft 12 of the torque converter T, a stator 15 connected to a stationary part through a one-way clutch 14, and a direct clutch 16. The output shaft 12 of the torque converter T serves as the input shaft of the overdrive mechanism OD.

The overdrive mechanism OD includes frictional engagement means such as a multi-disc clutch C0, multi-disk brake B0 and a one-way clutch F0, and a planetary gear device P0. The planetary gear device P0 has various constituent parts which are brought into and out of engagement with other parts such as a stationary part, e.g., a main transmission case 20, input shaft, output shaft and other parts, in accordance with the respective states of selective engagement of the above-mentioned frictional engagement means.

More specifically, the planetary gear device P0 has a carrier 21 connected to the output shaft 12, a ring gear 23 connected to the output shaft 22 of the overdrive mechanism OD, a sun gear 24 rotatably carried by the input shaft 12 and fixed to the main transmission case 20 through the brake B0, the sun gear 24 being connected to the carrier 21 through the clutch C0 and also through the one-way clutch Fo parallel to the clutch C0 and planetary pinions 25 rotatably carried by the carrier 21 and held in meshing engagement with the sun gear 24 and the ring gear 23.

The output shaft 22 of the overdrive mechanism OD serves as the input shaft of the underdrive mechanism UD which has three forward speed gears and one reverse gear.

The underdrive mechanism UD has frictional engagement means such as multi-disc clutches C1 and C2, a belt brake B1, multi-disc brakes B2 and B3, one-way clutches F1 and F2, a primary planetary gear device P1 and a secondary planetary gear device P2.

The primary planetary gear device P1 includes a ring gear 31 connected to the output shaft 22 through the clutch C1, a carrier 33 connected to the output shaft 32 of the underdrive mechanism UD, a sun gear 34 connected to the output shaft 22 through the clutch C2 and fixed to the main transmission case 20 through the belt brake B1 and also through a series connection of the one-way clutch F1 and the brake B2 which is parallel to the brake B1 and planetary pinions 35 rotatably carried by the carrier 33 and held in meshing engagement with the sun gear 34 and the ring gear 31.

The secondary planetary gear device P2 includes a carrier 36 which is fixed to the main transmission case 20 through the brake B3 and also through the one-way clutch F2 parallel to the brake B3, a sun gear 37 formed integrally with the sun gear 34 of the primary planetary gear device P1, a ring gear 38 connected to the output shaft 32, and planetary pinions 39 rotatably carried by the carrier 36 and held in meshing engagement with the sun gear 37 and the ring gear 38.

A main hydraulic controller 100 is accommodated by an oil pan 40 connected to the underside of the main transmission case 20 and is provided at the underside thereof with an oil strainer 101. The main hydraulic controller 100 operates in accordance with various factors representing the state of running of the vehicle, e.g., throttle opening of the engine E, vehicle running speed and so forth, so as to selectively engage and disengage the clutches and brakes, thereby effecting gear change over four forward speed gears including the overdrive O/D and the reverse gear which is selected manually.

The sub transmission 50 has a sub transmission case 51 which is coupled to the rear end of the main transmission case 20 by means of a plurality of bolts, such that the output shaft 32 of the main transmission 10 constitutes the input shaft of the sub transmission 50. More specifically, the sub transmission 50 has frictional engagement means such as a clutch C3, a brake B4 and a clutch C4 which are driven by the input shaft constituted by the common output shaft of the planetary gear devices P1 and P2. The sub transmission 50 has a first output shaft 54 connected in series to the output shaft 32, a planetary gear device P3 interposed between the output shaft 32 and the first output shaft 52, a four-wheel drive sleeve 53 rotatably fitted around the first output shaft 52, a second output shaft 52 disposed in parallel with the output shaft 32 and projecting in the direction opposite to the first output shaft 52, and a transfer mechanism 55 through which the sleeve 53 is connected to the second output shaft 54. The planetary gear device P3 includes a sun gear 56 splined to the end of the output shaft 32, planetary pinions 57 meshing with the sun gear 56, a ring gear 58 meshing with the planetary pinions 57, and a carrier 59 rotatably carrying the planetary pinions 57 and connected to the free end of the first output shaft 52. A parking gear 61 is formed on the outer peripheral surface of cylinder 60 which is connected to the carrier 59. The arrangement is such that, when a shift lever (not shown) of the main transmission 10 is operated to select a parking position, a stopper 62 engaged with the parking gear 61 thereby fixing the first output shaft 52.

The frictional engagement means, i.e., clutches and brakes, of the sub transmission 50 are selectively operated to be engaged and disengaged by a sub hydraulic controller 400 which is disposed in an oil pan 63 under the sub transmission case 51.

Figure 3:
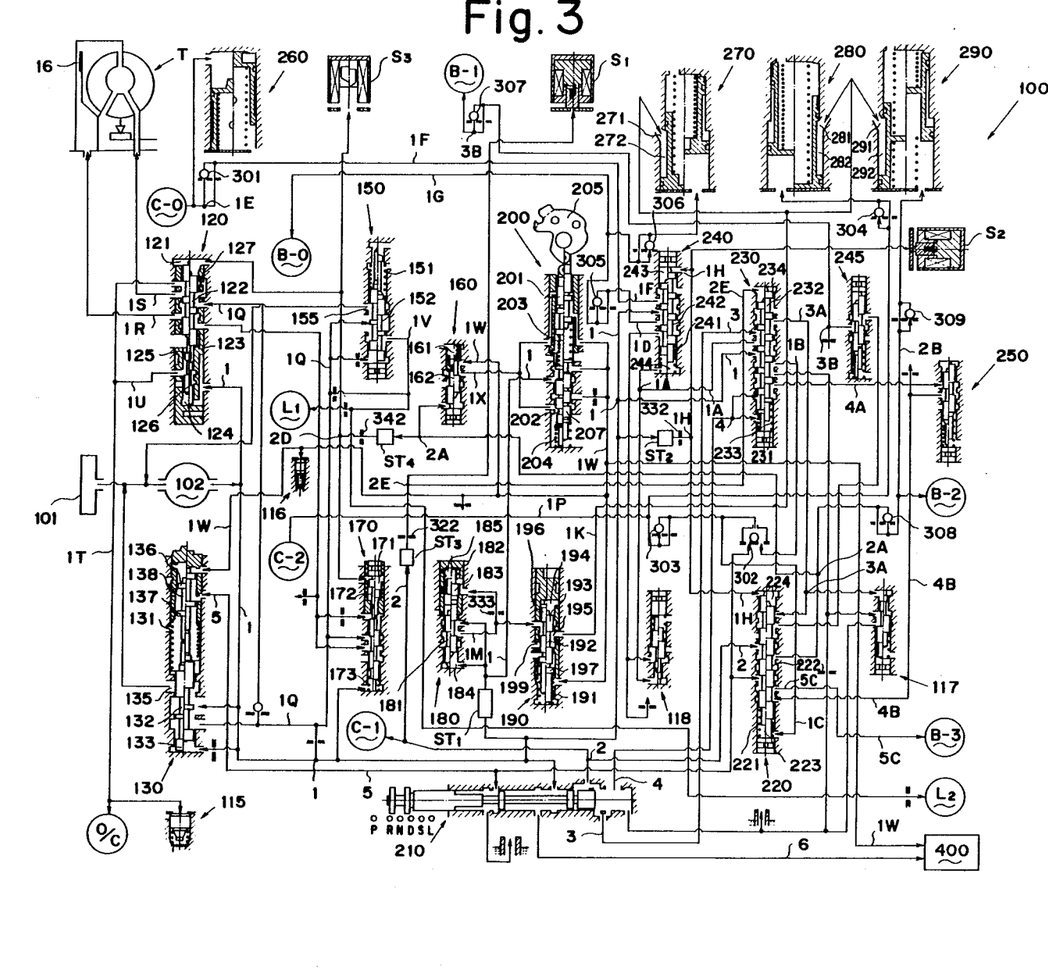
FIG. 3 is the hydraulic circuit diagram of a hydraulic controller of a main transmission.

FIG. 3 shows the detail of the main hydraulic controller 100 for controlling the main transmission 10.

As will be seen from this Figure, the main hydraulic controller 100 has the following parts: an oil strainer 101; an oil pump 102; a cooler by-pass valve 115 for regulating the oil pressure in an oil cooler O/C; a pressure relief valve 116; a release clutch control valve 117; a release brake control valve 118; a lock-up relay valve 120; a pressure regulator valve 130 for regulating the pressure of a working fluid or oil which is supplied by the oil pump 102 to an oil passage 1; a second pressure regulator valve 150 through which the oil is supplied both to a lubricating oil supply passage L1 leading to the main transmission 10 and a working oil supply passage L2 for the sub transmission 50; a cut-back valve 160; a lock-up control valve 170; a first accummulator control valve 180; a second accummulator control valve 190; a throttle valve 200 producing the hydraulic pressure corresponding to the throttle opening in the oil passage 1A; a manual valve 210 which distributes the line pressure in the oil passage 1 selectively to oil passages 2 to 6; a 1-2 shift valve 220; a 2-3 shift valve 230; a 3-4 shift valve 240; an intermediate coast modulator valve 245 which regulates the pressure of the oil supplied to the brake B1; a low coast modulator valve 250 for regulating the pressure of the oil supplied to the hydraulic servomotor B-3; an accummulator 260 for smoothing the engagement of the clutch C2; an accummulator 270 for smoothing the engagement of the brake B0; an accummulator 280 for smoothing the engagement of the clutch C2; an accummulator 290 for smoothing the engagement of the brake B2; hydraulic servomotors C-0, C-1 and C-2 for the clutches C0, C1 and C2; hydraulic servomotors B-0, B-1, B-2 and B-3 for the brakes B0, B1, B2 and B3; flow-rate control valves for controlling the flow rates of oil flowing therethrough, the flow-rate control valves being respectively denoted by 301, 303, 304, 305, 306, 307, 308 and 309 and provided with respective check valves; a shuttle valve 302; oil strainers ST1, ST2, ST3 and ST4; a first solenoid valve S1 adapted for controlling the 2-3 shift valve 230 under the control of a later-mentioned electronic controller or computer 600; a second solenoid valve S2 adapted for controlling both the 1-2 shift valve 220 and the 3-4 shift valve 240 under the control of the computer 600; a third solenoid valve S3 adapted to control both the lock-up relay valve 120 and the lock-up control valve 170 under the control of the computer 600; and oil passages providing communication between the valves and the hydraulic cylinders of respective clutches and brakes.

As stated before, the manual valve 210 is operated manually by means of the shift layer (not shown) of the main transmission 10 disposed in the vicinity of the driver's seat. The shift lever has main shift positions Mp of the ranges P (parking), R (reverse), N (neutral), D (drive), S (second) and L (low) of the main shift position Mp. Table 1 shows the gear stages, i.e., the fourth (4), third (3), second (2) and first (1) gears obtainable in the respective ranges of the main shift position Mp, as well as the states of clutches and brakes corresponding to the respective gear stages.

TABLE 1

| Mp | | S1 | S2 | S3 | C1 | C2 | C0 | B1 | B2 | B3 | B0 | F1 | F2 | F3 |
|---|---|---|---|---|---|---|---|---|---|---|---|---|---|---|
| P | | O | X | X | X | X | E | X | X | X | X | f | f | f |
| R | | O | X | X | X | E | E | X | X | E | X | f | f | f |
| N | | O | X | X | X | X | E | X | X | X | X | f | f | f |
| D | 1 | O | X | X | E | X | E | X | X | X | X | f | L | (L) |
|   | 2 | O | O | ⊙ | E | X | E | X | E | X | X | L | f | (L) |
|   | 3 | X | O | ⊙ | E | E | E | X | E | X | X | f | f | (L) |
|   | 4 | X | X | ⊙ | E | E | X | X | E | X | E | f | f | f |
| S | 1 | O | X | X | E | X | E | X | X | X | X | f | (L) | (L) |
|   | 2 | O | O | ⊙ | E | X | E | E | E | X | X | (L) | f | (L) |
|   | 3 | X | O | ⊙ | E | E | E | X | E | X | X | f | f | (L) |
|   | (3) | X | X | X | E | E | E | X | E | X | X | f | f | (L) |
| L | 1 | O | X | X | E | X | E | X | E | X | X | f | (L) | (L) |
|   | 2 | O | O | X | E | X | E | E | E | X | X | (L) | f | (L) |
|   | (1) | X | X | X | E | X | E | X | E | X | X | f | (L) | (L) |

In table 1, marks O and X represent the fact that the solenoid valves S1 and S2 are energized and de-energized, respectively, whereas the mark ⊙ shows that the solenoid valve S3 is energized to lock-up the transmission. The mark X appearing in the column of the solenoid valve S3 indicates that the solenoid valve S3 is de-energized to release the lock-up state. The symbol E shows that the clutches and the brakes are engaged, while the symbol X in the columns of clutches and brakes indicate that the clutches and brakes are released. The symbol L indicates that the one-way clutch is in the engaged in the engine driving condition even through this engagement is ensured also by a clutch or a brake connected in parallel with this one-way clutch, i.e., it indicates that the one-way clutch is locked. The symbol (L) shows that the one-way clutch is engaged only in the engine driving condition but is disengaged in the engine braking condition. Finally, the symbol f indicates that the clutch is in the free state.

Table 2 shows the states of communication between the oil passage 1 and the oil passages 2 to 6, as obtained in the respective positions of the shift lever of the main transmission 10.

TABLE 2

| | P | R | N | D | S | L |
|---|---|---|---|---|---|---|
| Oil passage 2 | X | X | X | O | O | O |
| Oil passage 3 | X | X | X | X | O | O |
| Oil passage 4 | X | X | X | X | X | O |
| Oil passage 5 | X | O | X | X | X | X |
| Oil passage 6 | X | O | O | O | O | O |

In Table 2, a mark O shows establishment of the communication that allows delivery of the line pressure to the respective oil passages, whereas a mark X indicates that the respective oil passages are drained.

Figure 4:
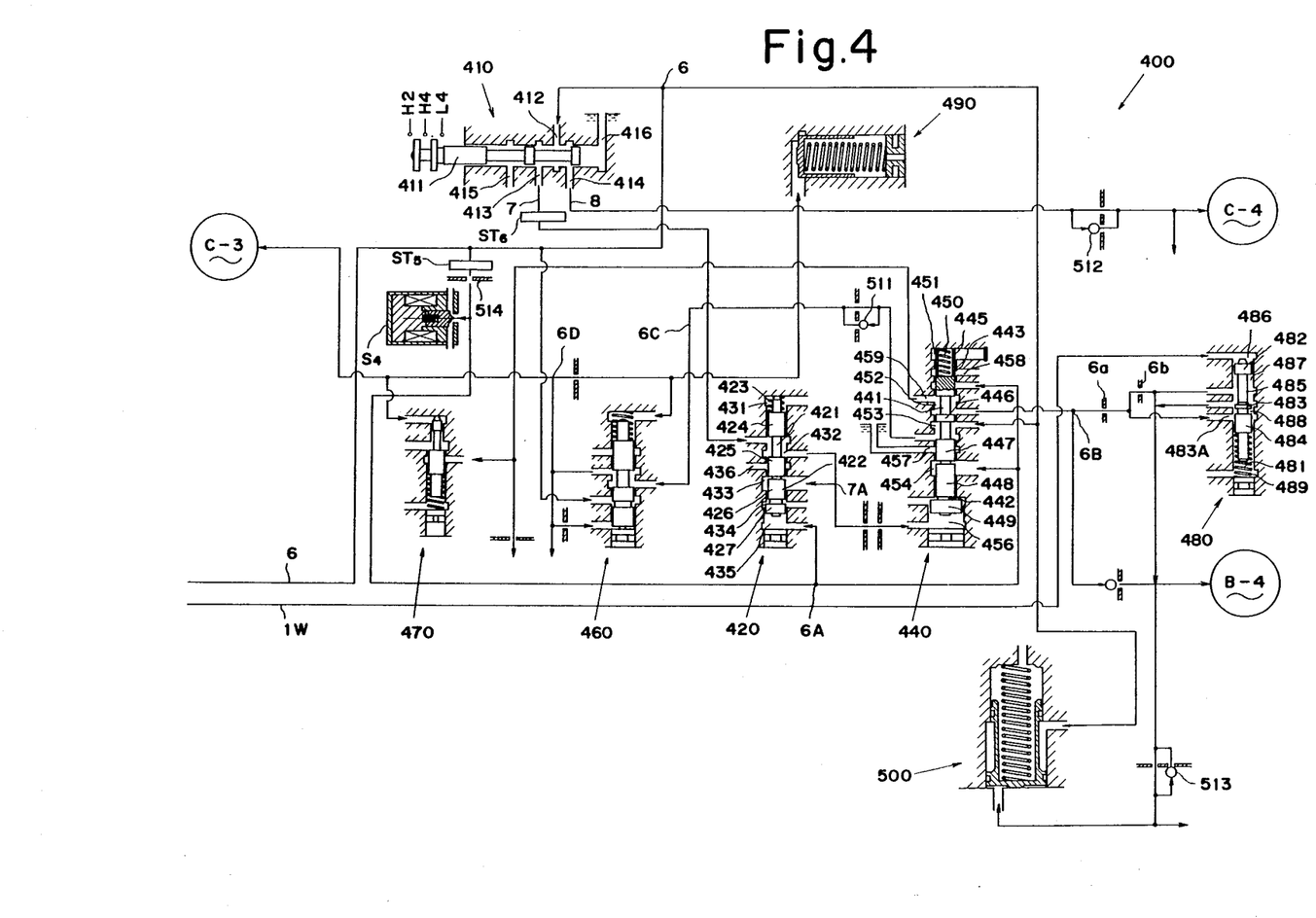
FIG. 4 is the hydraulic circuit diagram of a hydraulic controller of a sub transmission.

FIG. 4 shows the detail of the sub hydraulic controller 400 for controlling the four-wheel drive sub transmission 50.

The sub hydraulic controller is constituted by the following major parts: a transfer manual valve 410 of the first hydraulic switching means which supplys the working oil supplied through the oil passage 6 of the main hydraulic controller 100 both to the oil passages 7 and 8 by means of a shift lever provided in the driver's seat and operated manually; a relay valve 420 which is a third hydraulic switching means; a low-high switching valve 440 for switching the engagement of the clutch C3 and the brake B4; a third accummulator control valve 460; a shift timing valve 470; an orifice control valve 480 for smoothing the engagement of the brake B4; an accummulator 490 for smoothing the engagement of the clutch C3; an accummulator 500 for smoothing the engagement of the brake B4; hydraulic servomotors C-3, C-4 and B-4 of the clutches C3, C4 and the brake B4; flow-rate control valves 511, 512 and 513 provided with check valves and adapted to control the flow rate of the pressurized oil flowing therethrough; oil strainers ST5 and ST6; a fourth solenoid valve S4 of a fourth hydraulic switch mean which is operated by the output of the later-mentioned computer 600; and oil passages providing communication between respective valves and hydraulic cylinders of respective clutches and brakes.

The transfer manual valve 410 has a spool 411 which is connected to a shift lever (not shown) provided in the vicinity of the driver's seat. The transfer manual valve 410 also has an in-port 412 communicating with the oil passage 6 of the main hydraulic controller 100 for the main transmission 10, an out-port 413 communicating with the oil passage 7, an out-port 414 communicating with the oil passage 8, and drain ports 415 and 416. When the spool 411 of the transfer manual valve 410 is held in a two-wheel drive direct coupling (H2) position, the oil passage 6 is communicated with the oil passage 7, while the oil passage 8 is communicated with the drain port 416. When the spool 411 is held in a four-wheel drive direct coupling (H4) position, the oil passage 6 communicates with both the oil passage 7 and the oil passage 8. Finally, when the spool 411 is held in a reduced speed four-wheel drive (L4) position, the oil passage 6 is communicated with the oil passage 8, while the oil passage 7 is drained through the drain port 415.

The relay valve 420 has a spool 421 and a plunger 422 arranged in series with the spool 421. The spool 421 has an upper land 424 urged by a spring 423 and a lower land 425, which are of equal diameter, as viewed in FIG. 4. The plunger 422 has an upper land 426 of the same diameter as the lands of the spool 421 and a lower land 427 of a diameter greater than the diameter of the upper land 426. The spool 421 and the plunger 422 define an upper oil chamber 431, a first intermediate oil chamber 432 between the upper land 424 and the lower land 425, a second intermediate oil chamber 433 between the spool 421 and the plunger 422, a third intermediate oil chamber 434 between the upper land 425 and the lower land 427, and a lower oil chamber 435.

The operation of the relay valve 420 is as follows. When the pressurized oil is supplied to the lower oil chamber from the oil passage 6A, the spool 421 and the plunger 422 are displaced upwardly, so that the oil passage 7 is brought into communication with the line pressure supply passage 7A through the first intermediate oil chamber 432, so that the supply and the discharge of the line pressure to and from the lower oil chamber 456 of the low-high switching valve 440 is possible through the switching of the transfer manual valve 410. When the oil passage 7 is communicated with the line pressure supply passage 7A and the line pressure is supplied to the lower oil chamber 456 of the low-high switching valve 440 through the transfer manual valve 410, the feedback pressure is supplied to the second intermediate oil chamber 433 so that the spool 421 is fixed at the upper position. In this state, if the solenoid valve S4 is energized in response to the output from the computer 600 so as to allow the oil pressure to be drained from the lower oil chamber 435, the plunger 422 is moved to the lower position, while the spool 421 remains in the upper position, so as to maintain the supply of the line pressure to the lower oil chamber 456 of the low-high switching valve 440. If the line pressure in the oil passage 7 is relieved through the transfer manual valve 410 in this state, or if the oil passage 7 is communicated with the line pressure supply passage 7A and the lower pressure is drained from the lower oil chamber 435 as a result of energization of the fourth solenoid valve S4 by the output from the computer 600 while the line pressure in the lower oil chamber 456 of the low-high switching valve 440 is being drained through the transfer manual valve 410, the spool 421 and the plunger 422 are displaced downwardly so as to bring the line pressure supply passage 7A into communication with the drain port 436 through the first intermediate oil chamber 432. When the spool 421 is held in the lower position, the supply and discharge of the line pressure to and from the lower oil chamber 456 of the low-high switching valve 440 through transfer manual valve 410 does not proceed, so that the spool 441 and the plunger 442 of the low-high switching valve 440 are held in the lower position, as viewed in FIG. 4.

The low-high switching valve 440 has a first position (the lower side shown in FIG. 4) and a second position (the upper side shown in FIG. 4). As viewed in FIG. 4, the low-high switching valve 440 has a low-high switching spool 441 for serving as a switching valve which conducts supply and discharge of the line pressure to and from the servomotors C-3 and B-4 of the clutch C3 and the brake B4 as it is moved between the first position (the lower side in FIG. 4) and the second position (the upper side in FIG. 4); and an inhibitor valve 442 which is disposed in series with the low-high switching spool 441, has a first position (the lower side in FIG. 4) and a second position (the upper side in FIG. 4), and adapts the low-high switching spool 441 for the second position when the second position (the upper side shown in FIG. 4). The low-high switching spool 441 has an upper sleeve-like land 445 urged by a sping 450 serving as means for setting the low-high switching spool 441 in the first position, a lower land 447 and an intermediate land 446. The inhibitor valve 442 has an upper land 448 of the same diameter as the lands of the low-high switching spool 411, and a lower land 449 having a greater diameter than the upper land 448. The low-high switching spool 441 411 and the inhibitor valve 442 define an upper oil chamber 451, a first and second intermediate oil chambers 452 and 453 between the sleeve-like land 445, the intermediate land 446 and the lower land 447, an oil chamber 454 between the low-high switching spool 441 and the inhibitor valve 442, and a lower oil chamber 456.

The operation of this low-high switching valve 440 is as follows. When the spool 441 is held in the lower position, the upper oil chamber 451 is communicated with the oil passage 6A through the oil port 443 of the sleeve-like land 445, while the first intermediate oil chamber 452 and the second oil chamber 453 provide, respectively, communication between the line pressure passage 6 and a speed-reduction oil passage 6B and between the direct-coupling oil passage 6C and a drain port 457. Conversely, when the spool 441 is held in the upper position, the upper oil chamber 451 is communicated with a drain port 458 through the oil port 443 of the sleeve-like land 445, while the first intermediate oil chamber 452 and the second intermediate oil chamber 453 provide, respectively, communication between the speed-reduction oil passage 6B and a drain port 459 and between the oil passage 6 and the direct-coupling oil passage 6C. On the other hand, the oil chamber 454 is communicated with an oil passage 6A which delivers oil pressure corresponding to the signal supplied to the fourth solenoid valve S4. This oil pressure in the oil chamber 454 serves to normally bias the spool 411 to the second position (the upper side), while urging the inhibitor valve 442 to the first position (the lower side). The lower oil chamber 456 urges normally the inhibitor valve 442 to the second position (the lower side).

The orifice control valve 480 is a control valve which regulates the pressure of the working oil supplied to the oil passage 6B and delivers the regulated pressure to the hydraulic servomotor B-4. The orifice control valve 480 has a spool 485 which is biased upwardly by a spring 481 and which has an upper land 482, an intermediate land 483 and a lower land 484. The orifice control valve 480 has an upper oil chamber 486 on the upper side of the upper land 482, and upper side oil chamber 487 between the upper land 482 and the intermediate land 483, a lower side oil chamber 488 between the intermediate land 483 and the lower land 484, and a lower oil chamber 489 accommodating the spring 481. The spool 485 has an orifice 483A through which the upper side oil chamber 487 is communicated with the lower side oil chamber 488.

The upper oil chamber 486 is communicated with the oil passage 1W of the throttle valve 200 in the main hydraulic controller 100. The spool 485 is regulated by the hydraulic pressure corresponding to the throttle opening and applied to the upper oil chamber 486 and by the spring 481, so as to deliver the line pressure supplied to the oil passage 6B to the hydraulic servomotor B-4 while selecting orifices 6a and 6b provided in the oil passage 6B.

The fourth solenoid valve S4 is controlled by the computer 600 such that it is switchable from the de-energized state to the energized state on condition that the shift lever (not shown) is in the L4 range (reduced-speed four-wheel drive) and that the state of running of the vehicle meets a predetermined condition, and from the energized state to the de-energized state on condition that the shift lever is in the H2 (two-wheel drive direct coupling) of H4 (four-wheel drive direct coupling) range and that the state of running of the vehicle meets a predetermined condition. When de-energized, the fourth solenoid valve S4 acts to establish a solenoid pressure of high level equal to that of the line pressure in the oil passage 6A which communicates with the oil passage 2 through the orifice 514, whereas, when energized, it acts to drain the oil passage 6A, thereby generating a solenoid pressure of low level.

The shift lever of the sub transmission 50 provided in the driver's seat for operating the transfer manual valve 410 has sub shift positions Sp corresponding to the respective ranges of H2 (two-wheel drive direct coupling), L2 (reduced-speed two-wheel drive), H4 (four-wheel drive direct coupling) and L4 (reduced-speed four-wheel drive). The states of the brake B4 and the clutches C3 and C4, as well as the states of running of the vehicle, are shown in Table 3 in relation to respective ranges of the sub shift positions Sp.

TABLE 3

| Sp | S4 | C3 | B4 | C4 | Running mode |
|----|----|----|----|----|--------------|
| H2 | O  | X  | E  | X  | L2           |
|    | α  | E  | X  | X  | H2           |
| H4 | O  | X  | E  | E  | L4           |
|    | α  | E  | X  | E  | H4           |
| L4 | X  | E  | X  | E  | H4           |
|    | β  | X  | E  | E  | L4           |

In Table 3, the symbol α represents the fact that, once the solenoid valve S4 is de-energized, the direct coupling runnning condition is maintained even if the solenoid valve S4 is energized thereafter, whereas the symbol β represents the fact that, once the solenoid valve S4 is energized, the reduced-speed running condition is maintained even if the solenoid valve S4 is de-energized thereafter. The symbol E represents the fact that the clutch or the brake is held in the engaged state, while X represents the fact that the clutch or the brake is in the released state.

Table 4 shows the respective states of communication between the oil passage 6 and the oil passages 7 and 8, in respective shift ranges of the sub transmission.

TABLE 4

|              | H2 | H4 | L4 |
|--------------|----|----|----|
| Oil passage 7 | O  | O  | X  |
| Oil passage 8 | X  | O  | O  |

In Table 4, the mark O represents the fact that the oil passage is supplied with the line pressure, while the mark X represents the fact that the oil passage is drained.

The operations of the sub transmission 50 in respective ranges are as follows.

(A) When Transfer Manual Valve 410 Selects H2 Range

As shown in Table 4, the oil passage 7 is supplied with the line pressure, while the oil passage 8 is drained. In consequence, the hydraulic servomotor C-4 is drained so as to disengage the clutch C4. In this state, the power of the engine is not transmitted to the sleeve 53, so that the vehicle runs in the two-wheel drive mode.

When the fourth solenoid valve S4 is de-energized in chamber 435 of the relay valve 420 is supplied with the solenoid pressure of high level, so that the relay spool 421 and the relay plunger 422 are held in the upper positions as viewed in the drawing, whereby the oil passage 7 and the line pressure supply passage 7A are communicated with each other through the relay valve 420, thereby allowing the line pressure signal to be applied to the lower oil chamber 456 of the low-high switching valve 440. In consequence, the spool 441 and the inhibitor valve 442 of the low-high switching valve 440 are held in the second positions, i.e., upper positions, so that the oil passage 6B is communicated with the drain port 459 to be drained and the hydraulic servomotor B-4 is drained to release the brake B4. Since the spool 441 and the inhibitor valve 442 of the low-high switching valve 440 are held in the second upper positions, the oil passage 6C is communicated with the oil passage 6 and, hence, with the oil passage 6D through the third accummulator control valve 460, thereby supplying the line pressure to the hydraulic servomotor C-3 and thus engaging the clutch C3. The sub transmission 50 therefore operates in the H2 (two-wheel drive direct-coupling) range.

In this state, the spool 421 is fixed in the upper position by virtue of the line pressure fed back from the line pressure supply passage 7A to the second intermediate oil chamber 433 of the relay valve 420. Therefore, even if the fourth solenoid valve S4 is energized to supply the solenoid pressure of low level to the lower oil chamber 435, the plunger 422 alone is moved to the lower position while the relay spool 421 remains in the upper position, thus maintaining the supply of the line pressure signal to the lower oil chamber 456 of the low-high switching valve 440. Thus, the sub transmission 50 is maintained in the H2 (two-wheel drive direct coupling) range, even though the fourth solenoid valve S4 is energized.

(B) When Transfer Manual Valve 410 Selects H4 Range

In this case, the line pressure is supplied both to the oil passages 7 and 8. When the fourth solenoid valve S4 is de-energized in response to the output of the computer 600, the solenoid pressure of high level is supplied to the lower oil chamber 435 of the relay valve 420, so that the relay spool 421 and the relay plunger 422 are held in the upper positions so as to provide communication between the oil passage 7 and the line pressure supply passage 7A, thereby allowing the line pressure to be supplied to the lower oil chamber 456 of the low-high switching valve 440. Consequently, the spool 441 and the inhibitor valve 442 of the low-high switching valve 440 are held in the second positions, i.e., upper positions, so that the oil passage 6B is communicated with the drain port 459 to be drained and the hydraulic servomotor B-4 is drained to release the brake B4. The oil passage 6C is held in communication with the oil passage 6 because the spool 441 and the inhibitor valve 442 of the low-high switching valve 440 are held in the second or upper positions. The oil passage 6C is communicated also with the oil passage 6D through the third accummulator control valve 460. Therefore, the line pressure is supplied to the hydraulic servomotor C-3, thereby engaging the clutch C3. On the other hand, the line pressure supplied to the oil passage 8 is introduced into the hydraulic servomotor C-4, thereby engaging the clutch C4, and thus allowing the sub transmission 50 to operate in the H4 (four-wheel drive direct-coupling) range.

In this state, the line pressure is fed back to the second intermediate oil chamber 433 of the relay valve 420 from the line pressure supply passage 7A, so that the spool 421 is fixed in the upper position. When the fourth solenoid valve S4 is energized and the solenoid pressure of low level is supplied to the lower oil chamber 435, the plunger 422 alone is moved downwardly, while the spool 421 remains in the upper position, thereby maintaining the supply of the line pressure to the lower oil chamber 456 of the low-high switching valve 440 and, hence, the H4 (four-wheel drive direct coupling) range of the sub transmission 50.

(C) When Transfer Manual Valve 410 Selects L4 Range

The oil passage 7 is drained, while the oil passage 8 is supplied with the line pressure, as will be seen from Table 4. Thus, the oil passages 7 and 7A are drained, while the oil passage 8 is supplied with the line pressure, regardless of the position of the relay valve 420, so that the clutch C4 is engaged to maintain the four-wheel driving range of the sub transmission 50.

When the transfer manual valve 410 is shifted from the high speed range H2 or H4 down to the low speed range L4, if the fourth solenoid valve S4 is de-energized in response to the output from the computer 600, the solenoid pressure of high level is supplied from the oil passage 6A to the oil chamber 454 of the low-high switching valve 440, while the line pressure which has been supplied to the lower oil chamber 456 is drained through the oil passage 7A, relay valve 420, oil passage 7 and the transfer manual valve 410. In consequence, the inhibitor valve 442 of the low-high switching valve 440 is moved to the first or lower position by the line pressure supplied to the oil chamber 454, but the spool 441 of the same valve remains in the second or upper position so as to maintain the H4 (four-wheel drive direct-coupling) range of the sub transmission 50.

If the fourth solenoid valve S4 has been energized in response to the output of the computer 600 when the transfer manual valve 410 is shifted to the L4 range, or if the fourth solenoid valve S4 is switched from the de-energized state to the energized state while the transfer manual valve 410 has been set in the L4 range, the solenoid pressure supplied to the oil passage 6A is changed to the low level, so that the spool 441 of the low-high switching valve 440 is set in the first or lower position by the force of the spring 450. As a result, the oil passage 6B is brought into communication with the oil passage 6 through the low-high switching valve 440, so that the hydraulic servomotor B-4 is supplied with the line pressure through the orifice 6a, orifice 6b or the orifice control valve 480. On the other hand, the oil passage 6C is communicated with the drain port 457 through the first intermediate oil chamber 452 of the low-high switching valve 440, so that the hydraulic servomotor C-3 of the clutch C3 is drained, thereby shifting the sub transmission 50 to L4 (reduced-speed four-wheel drive) range. Once the L4 range is attained, the spool 441 is not moved even if the fourth solenoid valve S4 is de-energized, because the solenoid pressure of high level established in the oil passage 6A is supplied not only to the oil chamber 454 of the low-high switching valve 440 but also to the upper oil chamber 451 of the same valve through the oil port 443 in the sleeve-like land 445 of the spool 441, so that the sub transmission 50 is maintained in the L4 (reduced-speed four-wheel drive) range.

(D) When Transfer Manual Valve 410 is Shifted to H2 or H4 Range From L4 Range While Sub Transmission 50 is in Reduced-Speed Four-Wheel Drive Range In this case, if the fourth solenoid valve S4 has been energized by the output from the computer 600, the lower oil chamber 435 of the relay valve 420 is drained so that the spool 421 and the plunger 422 are held as a unit in the lower positions by the force of the spring 423. Therefore, the communication between the oil passage 7 and the oil passage 7A is interrupted by the upper land 424 and the lower oil chamber 456 of the low-high switching valve 440 is drained. As a result, the spool 441 and the inhibitor valve 442 of the low-high switch valve 440 are held in the lower position by the force of the spring 450 and the clutch C3 is released while the brake B4 is engaged, so that the sub transmission 50 is held in L2 (reduced-speed two-wheel drive) or L4 (reduced-speed four-wheel drive) range. However, when the fourth solenoid valve S4 is de-energized by the output of the computer 600, the solenoid pressure of the high level is introduced into the lower oil chamber 435 of the relay valve 420 as stated before, so that the spool 421 and the inhibitor valve 422 are moved to the upper positions so as to provide communication between the oil passage 7 and the line pressure supply passage 7A. This in turn permits the line pressure to be supplied to the lower oil chamber 456 of the low-high switching valve 440, so that the spool 441 and the inhibitor valve 442 are moved to and held in the second or upper positions. As a result, the oil passage 6B is brought into communication with the drain port 459 and, hence, drained, so as to release the brake B4. Meanwhile, the oil passage 6C is communicated with the oil passage 6 because the spool 441 and the inhibitor valve 442 of the low-high switching valve 440 are held in the upper positions. In consequence, the oil passage 6 is brought into communication with the oil passage 6D through the third accummulator control valve 460, so that the clutch C3 is engaged to change-over the sub transmission 50 to the H2 (two-wheel drive direct coupling) range or H4 (four-wheel drive direct-coupling) range.

Figure 5:
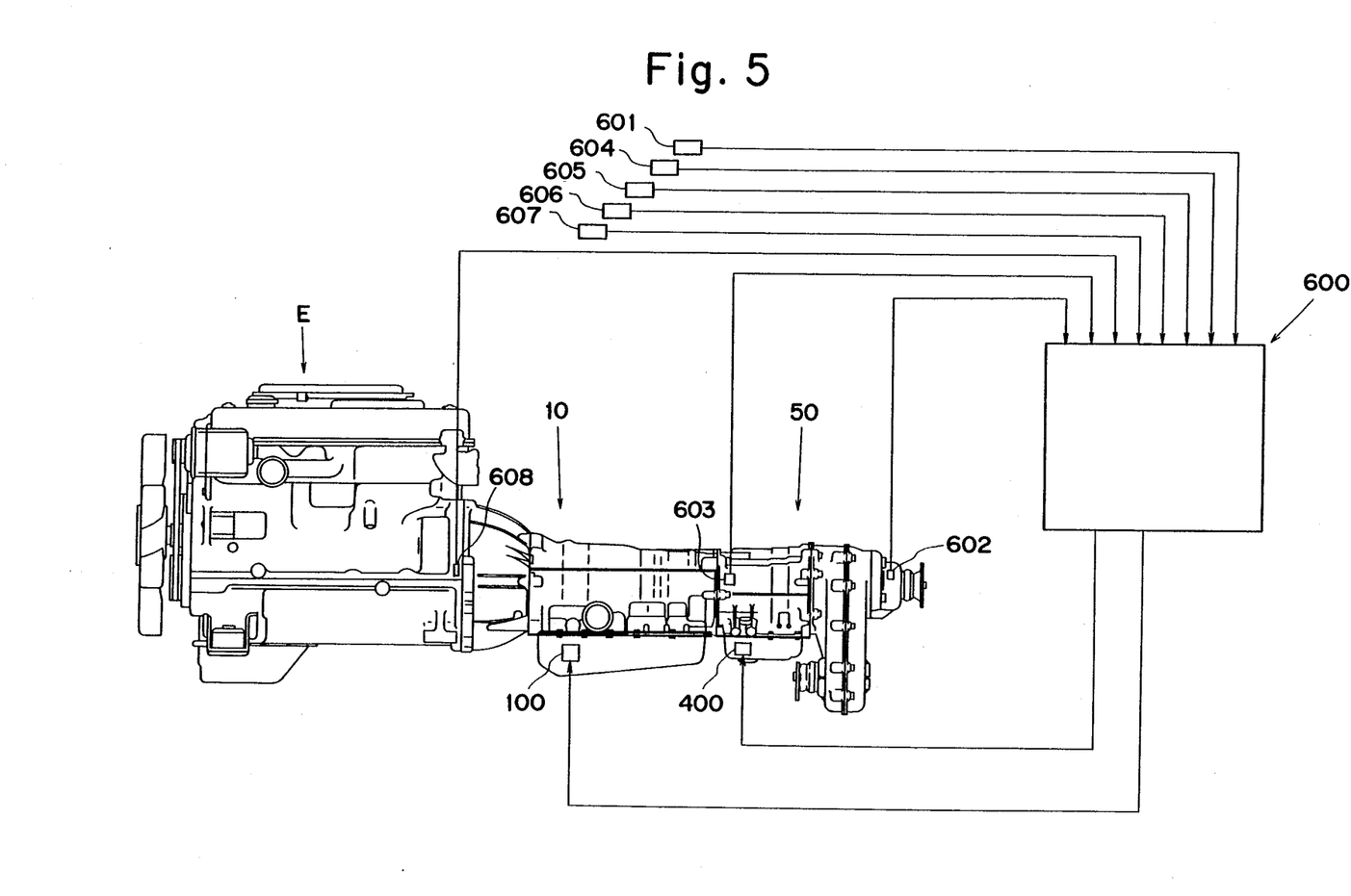
FIGS. 5 and 6 are the block diagrams of an electronic controller.
Figure 6:
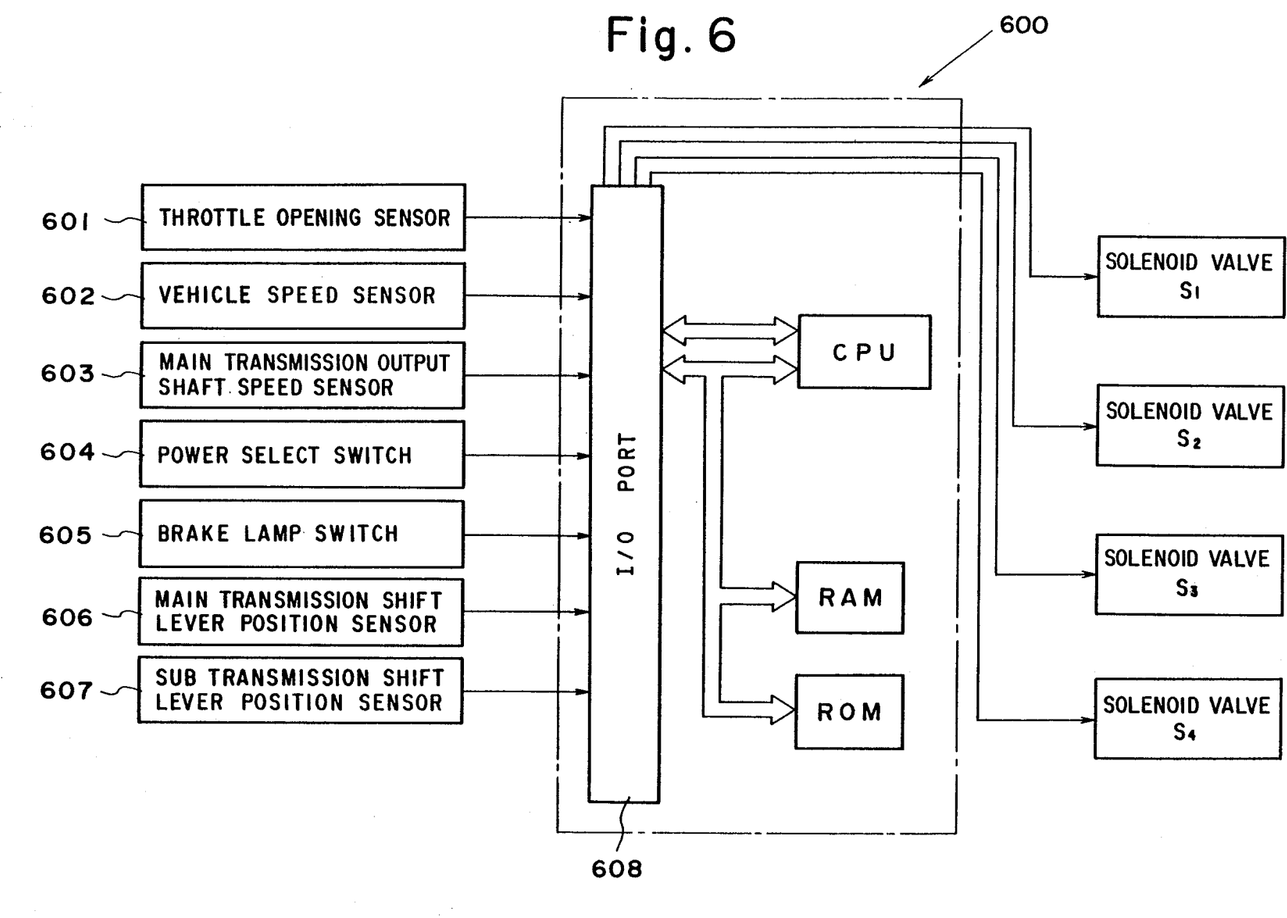

The computer which performs the transmission control of the four-wheel drive automatic transmission will be described with reference to the block diagrams shown in FIGS. 5 and 6.

The computer 600 which conducts the energization control of the solenoid valves S1–S4 of the main hydraulic controller 100 and the sub hydraulic controller 400 comprises a throttle opening sensor 601 for detecting the degree of acceleration; a vehicle speed sensor 602 for converting the signal detected from the shaft speed output into the vehicle speed; a main transmission shaft speed output sensor 603 for detecting the rotational speed of the output shaft 32 of the main transmission 10 which is the input shaft of the sub transmission 50; a power selector switch 604 for switching and setting the shift atterns such as economy, normal, and power, in accordance with the driver's selection; a brake lamp switch 605; a main transmission shift lever position sensor 606 for detecting the position (Mp) of the set range of the main transmission 10; a sub transmission shift lever postion sensor 607 for detecting the position (Sp) of the set range of the sub transmission 50; an I/O port which receives inputs corresponding to the running state of the vehicle as well as allowing outputs to the solenoid valves S1–S4; a central processing unit CPU; a random access memory RAM; and a read only memory ROM which stores the data as to the shift patterns such as the shift point and the lock-up point.

The above-described embodiment shows one that employs a transmission using a planetary gear device for the sub transmission. However, it may employ other transmissions such as a non-stage transmission controlled by the hydraulic controller.

The above-described embodiment shows one in which a four-wheel drive transfer which effects transmission of power to the front and rear wheels is used for the sub transmission, but the present invention is not limited to four-wheel drive transmissions and can be used for any transmission provided with a main transmission (the main transmission mechanism) and a sub transmission (the sub transmission mechanism).

The above-described embodiment shows one in which the manual valve driven by the manual operation is used as the first hydraulic switching means, but other types of control means may be ised such as an electromagnetic solenoid valve which electrically controls the hydraulic pressure.

What we claim is:

1. A transmission control device for a transmission which comprises a main transmission having a plurality of speed changing ratios and a sub transmission connected to the output shaft of the main transmission and having a plurality of speed changing ratios, the transmission control device comprising:
an electronic controller means for receiving outputs from a plurality of sensors capable of sensing a running state of a vehicle and for producing an output indicative thereof;
a main hydraulic controller means and a sub hydraulic controller means for controlling the main transmission and the sub transmission, respectively, in accordance with the output from the electronic controller means, and
wherein the sub hydraulic controller means comprises:
(a) a hydraulic pressure source;
(b) a first hydraulic change-over means connected to the hydraulic pressure source via a line pressure passage;
(c) a second hydraulic change-over means for inhibiting the speed changing operation of the sub transmission in response to a signal from the electronic controller in accordance with the state of running of the vehicle; and
(d) a third hydraulic change-over means connected to the hydraulic pressure source via the line pressure passage, the first hydraulic change-over means via a first hydraulic passage, the second hydraulic change-over means via a second hydraulic passage, a direct-coupling hydraulic passage, and a reduced-speed hydraulic servomotor via a reduced-speed hydraulic passage, and wherein the third hydraulic change-over means comprises:
a first valve means connected to the first hydraulic change-over means via the first hydraulic passage and the second hydraulic change-over means via the second hydraulic passage,
a second valve means connected to the hydraulic pressure source via the line pressure passage, the second hydraulic change-over means via the second hydraulic passage, the direct-coupling hydraulic servomotor via the direct-coupling hydraulic passage, the reduced speed hydraulic servomotor via the reduced speed hydraulic passage, and the first valve means via a third hydraulic passage, and wherein:
the first hydraulic change-over means selectively connects the line pressure passage to the first hydraulic passage according to a manual operation,
the second hydraulic change-over means controls the charge and discharge of hydraulic pressure to and from the second hydraulic passage in accordance with the vehicle running state,
the first valve means controls the state of communication between the first hydraulic passage and the third hydraulic passage in accordance with the hydraulic pressure in the second hydraulic passage,
the second valve means selectively connects the line pressure passage to at least one of the direct-coupling hydraulic passage and the reduced-speed hydraulic passage in accordance with the hydraulic pressure in the second and third hydraulic passage, and wherein:
the second valve means selectively connects the line pressure passage to one of the direct-coupling hydraulic passage and the reduced-speed hydraulic passage in accordance with the hydraulic pressure in the second hydraulic passage when the line pressure passage is disconnected to the first hydraulic passage by the first hydraulic change-over means, and
the second valve means selectively connects the line pressure passage to one of the direct-coupling hydraulic passage and the reduced-speed hydraulic passage in accordance with the hydraulic pressure in the third hydraulic passage which is selectively connected to the first hydraulic passage in accordance with the hydraulic pressure in the second hydraulic passage when the line pressure passage is connected to the first hydraulic passage by the first hydraulic change-over means.

2. The transmission control device according to claim 1, wherein the second hydraulic change-over means being a solenoid valve connected to the hydraulic passage.

3. The transmission control device according to claim 2, wherein the first valve means comprises a spool and a plunger which are slidably received in a valve body, the plunger being adapted to receive at its one end the output hydraulic pressure from the solenoid valve through the second hydraulic passage and having its other end contacted by the spool, and wherein the spool has one end contacted by a spring and the other end contacted by the plunger, wherein the spool controls the state of communication between the first hydraulic passage and the third hydraulic passage, the first valve means being adapted to produce output hydraulic pressure in the third hydraulic passage in accordance with the output hydraulic pressure of the solenoid valve, the output hydraulic pressure in the third hydraulic passage being fed back to the other end of the spool so that the output hydraulic pressure in the third hydraulic passage being maintained regardless of the output hydraulic pressure from the solenoid valve.

4. The transmission control device according to claim 2, wherein the second valve means includes a low/high change-over valve including a low/high change-over spool and an inhibitor valve which are slidably received in a valve body, wherein the inhibitor valve having one end which receives the output hydraulic pressure from the first valve means and the other end contacting the low/high change-over spool, and wherein the low/high change-over spool having one end contacting a spring and the other end receiving the output hydraulic pressure from the solenoid valve and contacting the inhibitor valve, and wherein the second valve means selectively connects, in accordance with the output hydraulic pressure from the first valve means and the output hydraulic pressure of the solenoid valve, the line pressure passage to at least one of a direct-coupling hydraulic passage connected to a direct-coupling hydraulic servomotor and a reduced-speed hydraulic passage connected to a reduced-speed hydraulic servomotor.

5. The transmission control device according to claim 4, wherein the low/high change-over spool is adapted to receive at its one end the output hydraulic pressure from the solenoid valve so as to maintain its position, when it connects the line pressure passage to the reduced-speed hydraulic passage.

6. The transmission control device according to claim 2, wherein the first valve means comprises a spool and a plunger which are slidably received in a valve body, wherein the plunger being adapted to receive at its one end the output hydraulic pressure from the solenoid valve through the second hydraulic passage and having its other end contacted by the spool, and wherein the spool has one end contacted by a spring and the other end contacted by the plunger, the spool being adapted to control the state of communication between the first hydraulic passage and the third hydraulic passage, the first valve means being adapted to produce output hydraulic pressure in the third hydraulic passage in accordance with the output hydraulic pressure of the solenoid valve, the output hydraulic pressure in the third hydraulic passage being fed back to the other end of the spool so that the output hydraulic pressure in the third hydraulic passage is maintained regardless of the output hydraulic pressure from the solenoid valve, and wherein the second valve means includes a low/high change-over valve including a low/high change-over spool and an inhibitor valve which are slidably received in a valve body, and wherein the inhibitor valve has one end which receives the output hydraulic pressure from the first valve means and the other end contacting the low/high change-over spool, and wherein the low/high change-over spool has one end contacting a spring and the other end receiving the output hydraulic pressure from the solenoid valve and contacting the inhibitor valve, and wherein the second valve means selectively connects, in accordance with the output hydraulic pressure from the first valve means and the output hydraulic pressure of the solenoid valve, the line pressure passage to at least one of a direct-coupling hydraulic servomotor and a reduced-speed hydraulic passage connected to a reduced-speed hydraulic servomotor.

* * * * *